(12) United States Patent
Burton et al.

(10) Patent No.: US 6,651,154 B1
(45) Date of Patent: Nov. 18, 2003

(54) METHOD, SYSTEM, AND PROGRAM FOR EXPANDING THE STORAGE SPACE IN AN ARRAY OF STORAGE UNITS

(75) Inventors: David Alan Burton, Vail, AZ (US); Robert Louis Morton, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 09/614,074

(22) Filed: Jul. 11, 2000

(51) Int. Cl.[7] ................................................. G06F 11/00
(52) U.S. Cl. ........................ 711/202; 711/112; 711/114; 711/111
(58) Field of Search ................................ 711/202, 114, 711/112, 111; 714/7, 3, 202, 111, 112, 114; 710/104

(56) References Cited

U.S. PATENT DOCUMENTS

| | | | |
|---|---|---|---|
| 5,615,345 A | 3/1997 | Wanger | 395/309 |
| 5,634,111 A | 5/1997 | Oeda et al. | 395/480 |
| 5,787,242 A | 7/1998 | DeKoning et al. | 395/182.03 |
| 5,809,224 A * | 9/1998 | Schultz et al. | 714/7 |
| 5,809,279 A | 9/1998 | Oeda et al. | 395/480 |
| 5,812,754 A | 9/1998 | Lui et al. | 395/182.04 |
| 5,867,736 A | 2/1999 | Jantz | 395/894 |
| 5,895,493 A | 4/1999 | Gatica | 711/147 |
| 5,925,120 A | 7/1999 | Arp et al. | 710/131 |
| 5,933,824 A | 8/1999 | DeKoning et al. | 707/8 |
| 5,941,972 A | 8/1999 | Hoese et al. | 710/129 |
| 5,954,796 A | 9/1999 | McCarty et al. | 709/222 |
| 5,959,994 A | 9/1999 | Bogg et al. | 370/399 |
| 5,973,690 A * | 10/1999 | Ofer et al. | 345/803 |
| 6,000,010 A * | 12/1999 | Legg | 711/114 |
| 6,058,489 A * | 5/2000 | Schultz et al. | 714/7 |
| 6,092,169 A * | 7/2000 | Murthy et al. | 711/170 |
| 6,178,480 B1 * | 1/2001 | Tobagi et al. | 711/114 |

OTHER PUBLICATIONS

IBM Technical Disclosure Bulletin, "Performance Efficient Multiple Logical Unit Number Mapping for Redundant Array of Independent Disks," vol. 39, Issue No. 5, pp. 273–274, May 1996.*

* cited by examiner

Primary Examiner—Matthew Kim
Assistant Examiner—Stephen Elmore
(74) Attorney, Agent, or Firm—David W. Victor; Konrad Raynes Victor & Mann LLP

(57) ABSTRACT

Implementations describe the expansion of storage space in an array of storage units. The storage space formed by the storage units is configured as logical units to store data. Storage units are added to the array to form an expanded storage space. The storage units in the array prior to the addition of the storage units are in a pre-expansion storage space. At least one additional logical unit is configured in the expanded storage space such that the logical units existing prior to the addition of the storage units in the pre-expansion storage space are not affected by the logical units configured in the expanded storage space.

24 Claims, 7 Drawing Sheets

FIG.2
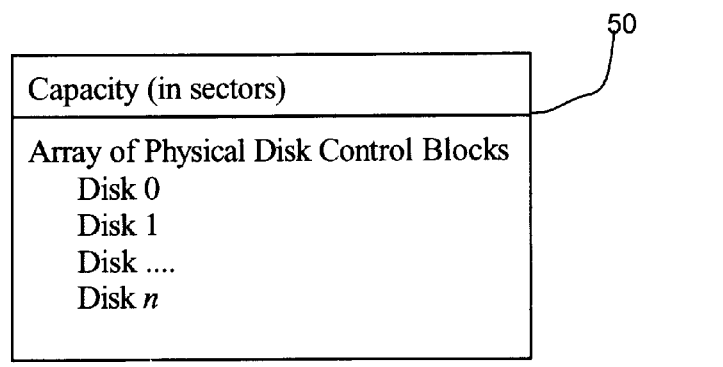
Array Control Block (ACB)
FIG.3
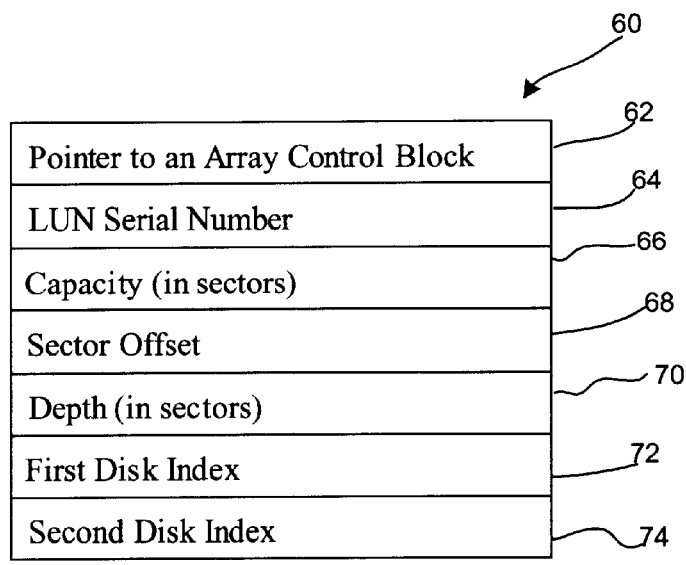
Logical Disk Control Block (LDCB)
FIG.4
| LUN Number | Pointer to LDCB |
|---|---|
| LUN 0 | LDCB xx |
| LUN 1 | LDCB xxx |
| ..... | ..... |
| LUN m | LDCB FFF |
LUN Mapping Array

FIG. 8

| | | Disk 0 | Disk 1 | Disk 2 | Disk 3 |
|---|---|---|---|---|---|
| Stripe 0 | | 0/P | 3/L0-0 | 6/L0-3 | 9/L0-6 |
| | | 1/P | 4/L0-1 | 7/L0-4 | 10/L0-7 |
| | | 2/P | 5/L0-2 | 8/L0-5 | 11/L0-8 |
| Stripe 1 | | 12/L0-9 | 15/P | 18/L0-12 | 21/L0-15 |
| | | 13/L0-10 | 16/P | 19/L0-13 | 22/L0-16 |
| | | 14/L0-11 | 17/P | 20/L0-14 | 23/L0-17 |
| Stripe 2 | | 24/L1-0 | 27/L1-3 | 30/P | 33/L1-6 |
| | | 25/L1-1 | 28/L1-4 | 31/P | 34/L1-7 |
| | | 26/L1-2 | 29/L1-5 | 32/P | 35/L1-8 |

FIG. 9

| | Disk 0 | Disk 1 | Disk 2 | Disk 3 | Disk 4 | Disk 5 |
|---|---|---|---|---|---|---|
| Stripe 0 | 0/P | 3/L0-0 | 6/L0-3 | 9/L0-6 | 12/L2-0 | 15/L2-3 |
| | 1/P | 4/L0-1 | 7/L0-4 | 10/L0-7 | 13/L2-1 | 16/L2-4 |
| | 2/P | 5/L0-2 | 8/L0-5 | 11/L0-8 | 14/L2-2 | 17/L2-5 |
| Stripe 1 | 12/L0-9 | 15/P | 18/L0-12 | 21/L0-15 | 30/L2-6 | 33/L2-9 |
| | 13/L0-10 | 16/P | 19/L0-13 | 22/L0-16 | 31/L2-7 | 34/L2-10 |
| | 14/L0-11 | 17/P | 20/L0-14 | 23/L0-17 | 32/L2-8 | 35/L2-11 |
| Stripe 2 | 24/L1-0 | 27/L1-3 | 30/P | 33/L1-6 | 48/L3-0 | 51/L3-3 |
| | 25/L1-1 | 28/L1-4 | 31/P | 34/L1-7 | 49/L3-1 | 52/L3-4 |
| | 26/L1-2 | 29/L1-5 | 32/P | 35/L1-8 | 50/L3-2 | 53/L3-5 |

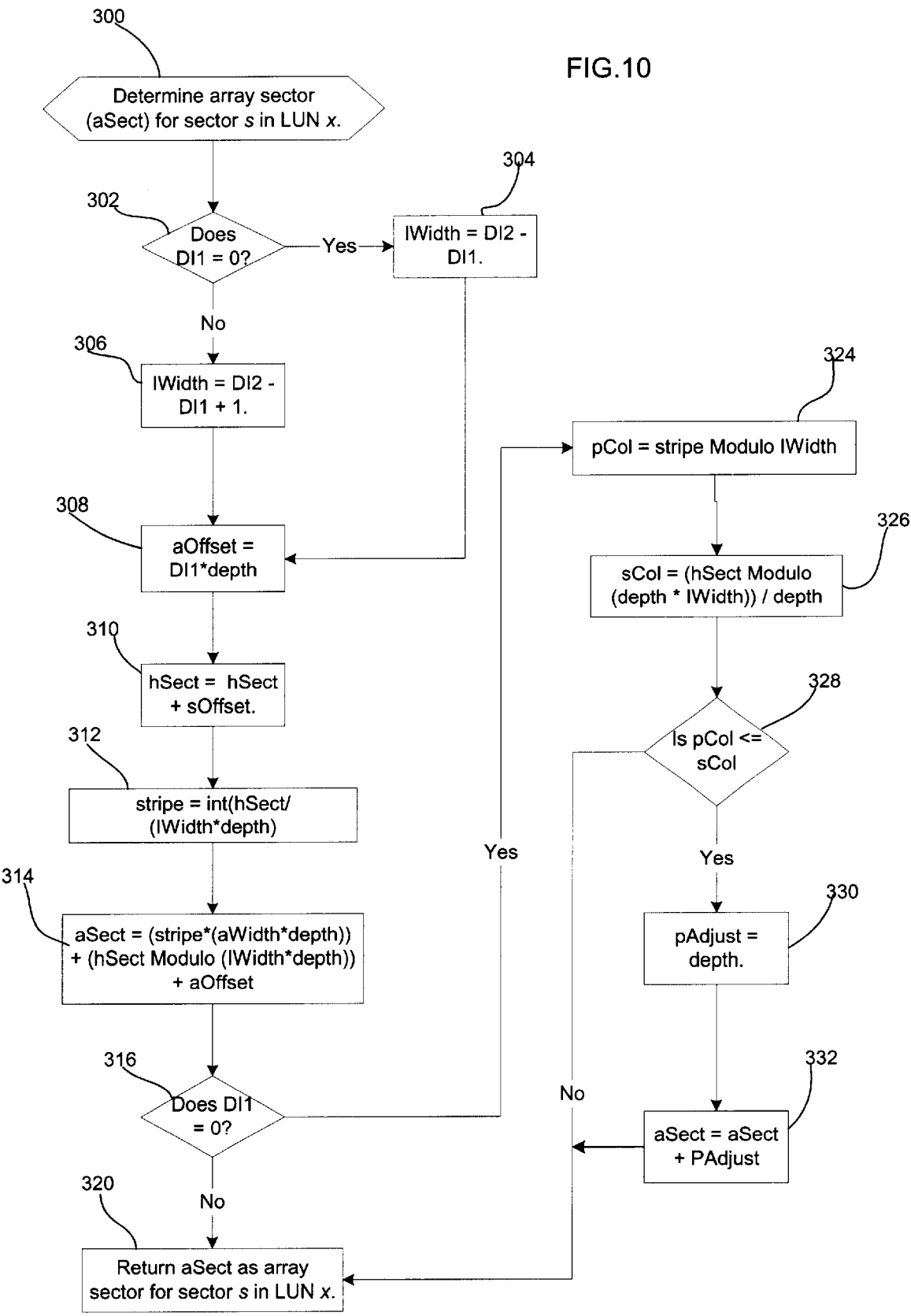

METHOD, SYSTEM, AND PROGRAM FOR EXPANDING THE STORAGE SPACE IN AN ARRAY OF STORAGE UNITS

CROSS-REFERENCE TO RELATED APPLICATIONS

This application is related to the following co-pending and commonly-assigned patent application entitled "METHOD, SYSTEM, PROGRAM, AND DATA STRUCTURES FOR MAPPING LOGICAL UNITS TO A STORAGE SPACE COMPRISES OF AT LEAST ONE ARRAY OF STORAGE UNITS," to Robert L. Morton and David A. Burton, having application Ser. No. 091613,681, which is filed on the same date herewith and all of which is incorporated herein by reference in its entirety.

BACKGROUND OF THE INVENTION

1. Field of the Invention

The present invention relates to a system, method, and program for increasing capacity of an array of storage units, such as disk drives, in a storage device.

2. Description of the Related Art

A storage controller system manages the input/output (I/O) requests from numerous host systems to a large storage space, such as a Direct Access Storage Device (DASD) comprised of numerous interconnected hard disk drives. The host systems view the storage space as a series of logical unit numbers (LUNs). For instance, with the Small Computer System Interface (SCSI), the host device driver would include the LUN number with the I/O request to access a logical block address (LBA) within the LUN. The storage controller maintains a mapping of LUNs to actual physical disks in the DASD. In this way, the storage controller maps the requested LBA in a LUN to a particular sector in a disk.

In prior art systems, a plurality of interconnected disks, such as a DASD, form an array of storage blocks or sectors. The sectors in the disk form an array having multiple rows and columns of sectors, where each sector can be identified as located within a column and row in the array. Data is striped across the disks. In a RAID (Redundant Array of Independent Disks) 5 configuration, each stripe includes parity data for all the data sectors in the stripe.

In prior art RAID arrays, to add a disk to increase the storage space of the array, the data currently in the array is copied to a backup location, the disks are added to the array, and the entire array is then reconfigured. The data at the backup location is then copied back to the array, with any logical unit numbers (LUNs) in the data reconfigured on the new expanded array.

The prior art procedure for expanding the size of an array is time consuming, because the current data in the array must be moved to a backup location before expanding the size of the array, and then copied back to the expanded array. Not only is this time consuming, but access to the data in the array is unavailable while the expanded array is being configured and the data is being copied back to the array.

Thus, there is a need in the art for an improved technique for expanding the storage size of the array.

SUMMARY OF THE PREFERRED EMBODIMENTS

To overcome the limitations in the prior art described above, preferred embodiments disclose a method, system, and program for expanding storage space in an array of storage units. The storage space formed by the storage units is configured as logical units to store data. Storage units are added to the array to form an expanded storage space. The storage units in the array prior to the addition of the storage units are in a pre-expansion storage space. At least one additional logical unit is configured in the expanded storage space such that the logical units existing prior to the addition of the storage units in the pre-expansion storage space are not affected by the logical units configured in the expanded storage space.

In further embodiments, configuration information is generated indicating a mapping of logical units to storage blocks in the array and stored in the array. Further, the mapping indicates a range of storage units in the pre-expansion storage space for each logical unit existing in the array prior to the expansion and a range of storage units in the expanded storage space for each logical unit configured in the expanded storage space.

Still further, data is striped to logical units in the pre-expansion storage space across the storage units in the pre-expansion storage space and data is striped to logical units in the expanded storage space to the storage units in the expanded storage space.

The preferred embodiments provide a method, system, and program for expanding the storage capacity of an array without affecting the configuration of logical units and data in the pre-expansion disks in the array. Further, with preferred embodiments, the array can be expanded without having to copy the current data to a backup location before adding and reconfiguring the array, thus reducing the time and operations needed to increase the storage space of an array of disks.

BRIEF DESCRIPTION OF THE DRAWINGS

Referring now to the drawings in which like reference numbers represent corresponding parts throughout:

FIGS. 2, 3, and 4 illustrate data structures that maintain the LUN configuration information for an array of disks in accordance with preferred embodiments of the present invention;

FIG. 8 illustrates a pre-expansion arrangement of an array of disks;

FIG. 9 illustrates an arrangement of an expanded array of disks in accordance with preferred embodiments of the present invention; and FIG. 10 illustrates logic implemented in a storage controller to map a requested storage block in a LUN to a sector in the array in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
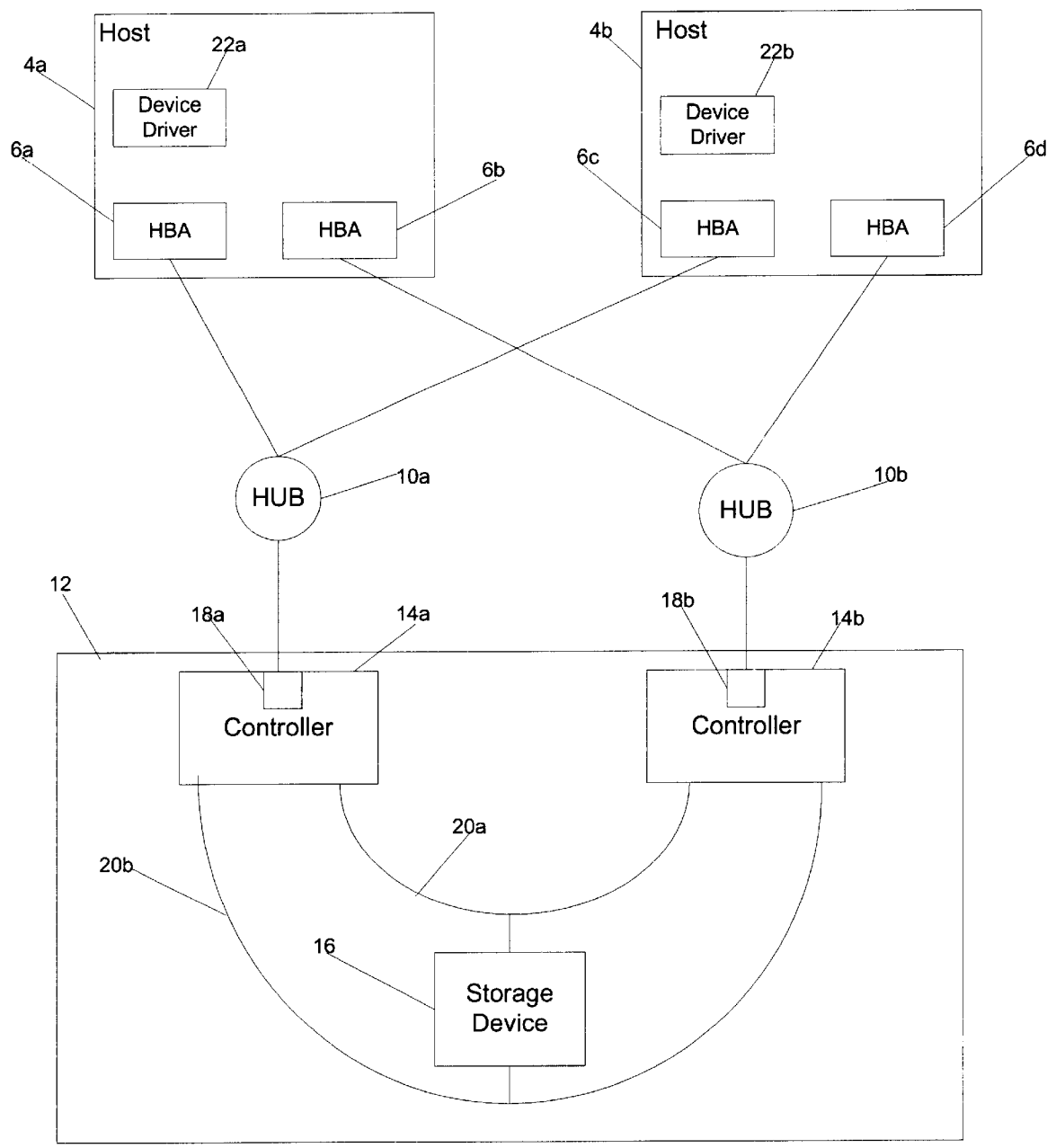
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients. The hosts 4a, b each include two host bus adaptors (HBAs) 6a, b and 6c, d, respectively. The HBAs 6a, b, c, d may comprise a Fibre Channel or Small Computer System Interface (SCSI) adaptor card or any other network adaptor card known in the art. The HBAs 6a, b, c, d allow the hosts 4a, b to communicate with storage controllers 14a, b via the hubs 10a, b. The hubs 10a, b may comprise the IBM Fibre Channel Storage Hub or Switch, the IBM SAN Fibre Channel Switch, or any other switching device known in the art. A storage subsystem 12 includes two controllers 14a, b that provide access to a storage device 16, such as a DASD. Each controller 14a, b includes at least one port 18a, b, respectively, through which a host 4a, b accesses the controller 14a, b. In preferred implementations, both controllers 14a, b can access any storage location in the storage device 16. The controllers 14a, b may comprise the IBM Fibre Channel Raid Storage Controller or any other storage controller known in the art that provides one or more hosts access to a single storage space or storage devices. Lines 20a, b provide communication from the controllers 14a, b to the storage device 16 such that either controller 14a, b can use the lines 20a, b to access any part of the storage device 16. The lines 20a, b may be implemented using the Fibre Channel interface. In such case, the controllers 14a, b would include Fibre Channel adaptors and the lines 20a, b would comprise cables connected to the controllers 14a, b to form Fibre Channel arbitrated loops (FCAL) to interconnect the controllers 14a, b to the storage device 16 components, e.g., hard disk drives.

In alternative embodiments, multiple hosts may connect to a single storage controller that provides access to a DASD. Storage subsystems that provide access to multiple hosts include high end storage controllers, such as the IBM 3990 and Enterprise Storage Server storage controller products, as well as others. Thus, the term "storage controller" or "controller" as used herein refers to any storage controller, storage server, control unit, or any other computing device that manages input/output (I/O) requests from multiple host systems to a physical storage space.

Each host system 4a, b includes a device driver 22a, b which is used to detect new LUN assignments and issue commands to determine information on the LUNs. Preferred embodiments are implemented using the SCSI protocol. In such case, the controllers 14a, b would provide inquiry data for each LUN, including information concerning parameters of the controller 14a, b and the LUN for which the inquiry data is provided. The inquiry data includes an eight byte world wide serial number for the LUN that is unique across the world for that LUN.

In preferred embodiments, the storage device 16 is comprised of one or more arrays. Each array is comprised of one or more contiguous or non-contiguous disks data. The disks within an array may be contained within a self-contained and movable housing, and capable of being removed and added to a storage device 16. In such case, the housing of the array would include a port to connect the array, and all its included disk drives, to the storage device 16 system. The disks in the array, may be managed as a Redundant Array of Independent Disks (RAID), using RAID algorithms known in the art. In preferred embodiments, the storage space of each array forms contiguous sectors. The LUNs each map to one or more of the disks in a single array. In preferred embodiments, the LUNs comprise a set of contiguous sectors in a single array. Thus, different LUNs may map to different arrays.

To maintain the configuration and mapping of LUNs to physical disks in an array, three data structures are maintained by the controllers 14a, b, an array control block (ACB), a logical device control block (LDCB), and a LUN mapping array. FIG. 2 illustrates the data fields in an array control block 50. The array control block (ACE) 50 indicates the disks in the ACB and the total capacity in sectors of all the disks in the ACB. As discussed, the storage device 16 may be comprised of multiple array control blocks. The logical device control block (LDCB) is a data structure used to link a LUN to a particular sector within the array. FIG. 3 illustrates the data fields in a logical device control block (LDCB) 60. The LDCB 60 includes a pointer 62 to an array control block (ACB) and a LUN serial number 64 that maps into the array control block (ACB) addressed by the pointer 62. The LUN serial number may comprise the eight byte world wide number for the LUN. A capacity field 66 indicates the total sector capacity of the LUN within the array control block (ACB). A sector offset field 68 indicates the offset from the first sector in the storage space of the array control block (ACB) where the LUN identified in the LUN field 64 begins. A depth field 70 indicates the depth of a stripe on a disk in the array in sectors. Thus, in RAID arrays, the number of sectors equal to the depth is written on a disk before writing data to the next disk in the array to stripe sectors.

The storage controllers 14a, b maintain a global LUN mapping array (GLMA) that includes for each entry a LUN number and either a NULL value if the LUN number is not currently configured in the system or a pointer to the logical disk control block (LDCB) that provides information on the location in an array where the LUN is located. In this way, the storage controller 14a, b maintains a consistent view of LUN numbers across all arrays in the storage device 16 so that two identical LUN numbers are not used in different arrays in the storage device 16.

FIG. 4 illustrates the data fields in a LUN mapping array 80 which includes an entry for all possible LUN numbers used by the storage controller 14a, b. Each LUN number entry includes either a pointer to the logical disk control block (LDCB) that provides information on how that LUN maps to sectors within an array or a NULL value indicating that the LUN number does not map to an array in the storage device 16. Thus, for each array, there is an array control block (ACB) 50 and a LUN map 80 that maps all LUNs assigned to sectors in the array control block (ACB) to a logical device control block (LDCB) 60 which provides information on the location in the array control block (ACB) 50 space of each LUN.

In preferred embodiments, the array control block (ACB) 50, LUN mapping array 80, and all logical device control blocks (LDCBs) 60 listed in the LUN map 80 are stored in sectors within one or more disks of the array, which provides non-volatile storage of all the configuration information needed to map LUNs to locations in the array storage space. In this way, each array is a self-contained storage system that includes self-defining configuration information on the LUNs that map into the array storage space. In preferred embodiments, the array configuration information (e.g., array control block 50, logical device control block (LDCBs) 60, and LUN mapping array 80) may be stored on multiple disks in the array using a RAID algorithm to provide further protection of the array configuration information in the event of a failure of one or more of the disks in the array.

In preferred embodiments, a storage controller, operating under control of firmware and/or software, would access the configuration data stored in the arrays, such as the array control block 50, logical device control blocks (LDCB) 60, and LUN mapping array 80, to configure the entire storage subsystem or storage space including the arrays. In a storage subsystem, the storage controller firmware and/or software may be implemented in a single controller that provides access to a storage device, e.g., DASD. Alternatively, the storage subsystem may comprise a dual controller system, such as that shown in FIG. 1. In dual controller systems, one storage controller 14a would function as a master and the other the slave, where the master performs configuration operations. If there is a failure at the master, then the slave would take control. Thus, both storage controllers 14a, b would include the firmware to perform the operations described in FIGS. 5–7.

Figure 5:
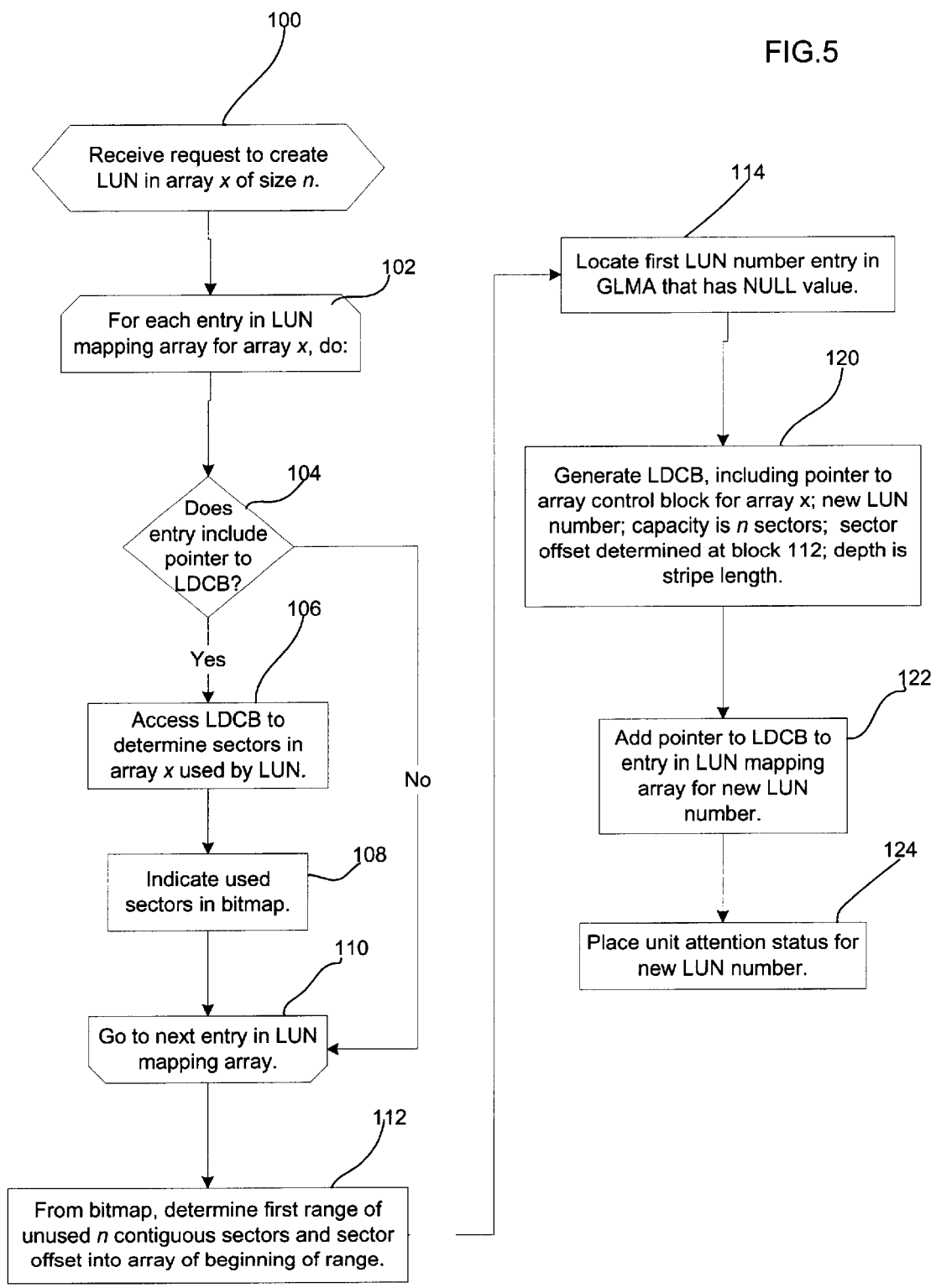
FIG. 5 illustrates logic implemented in a storage controller to add a LUN to an array in a storage subsystem in accordance with preferred embodiments of the present invention.

FIG. 5 illustrates logic implemented in firmware and/or software in the controllers 14a, b to add a LUN to an array x of size n in the storage device 16. A host system may include a configuration tool to request the controller 14a, b to add a LUN. Control begins at block 100 with the storage controller 14a, b receiving a request to create a LUN in array x of size n. For each entry i in the LUN mapping array of array x, the storage controller 14a, b performs the steps at block 104 to 108 to generate a bitmap or other data structure indicating the used and unused sectors in the array x. If (at block 104) the entry i includes a pointer to a logical device control block (LDCB), as opposed to a NULL value, then the storage controller 14a, b accesses (at block 106) the logical device control block (LDCB) to determine the sectors in array x used by the LUN. The storage controller 14a, b indicates (at block 108) the used sectors in a bitmap. At block 110, control proceeds back to block 102 to consider the next (i+1)th entry in the LUN mapping array x. If the entry i in the LUN mapping array 80 has the NULL value, then the storage controller would proceed to block 110 to consider the next (i+1)th entry. Thus, as a result of block 102 to 110, there is a bitmap table indicating ranges of sectors in the array x that are used for a particular LUN number.

From the bitmap, the storage controller 14a, b determines (at block 112) the first range of unused n contiguous sectors that can be used for the new LUN and the sector offset into the array x of the beginning of the range. From the LUN mapping array 80, the storage controller 14a, b locates (at block 114) the first LUN number entry in the global LUN mapping array (GLMA) having the NULL pointer, indicating a used LUN number in the storage device 16. The storage controller 14a, b then generates (at block 120) the logical disk control block (LDCB) including a pointer 62 to the array control block for array x; the capacity 66 is the total n sectors to include in the new LUN; a sector offset 68 into the array x is determined at block 112, i.e., the sector offset in the array x where the contiguous range of blocks for the new LUN begins. The depth 70 is the stripe depth on a disk. The storage controller 14a, b then adds a pointer (at block 122) to the generated LDCB in the LUN mapping array 80 for the new LUN number. A unit attention or asynchronous status is presented (at block 124) for the new LUN to cause the hosts 4a, b to request inquiry data on the new LUN to make the new LUN accessible to the hosts 4a, b.

Figure 6:
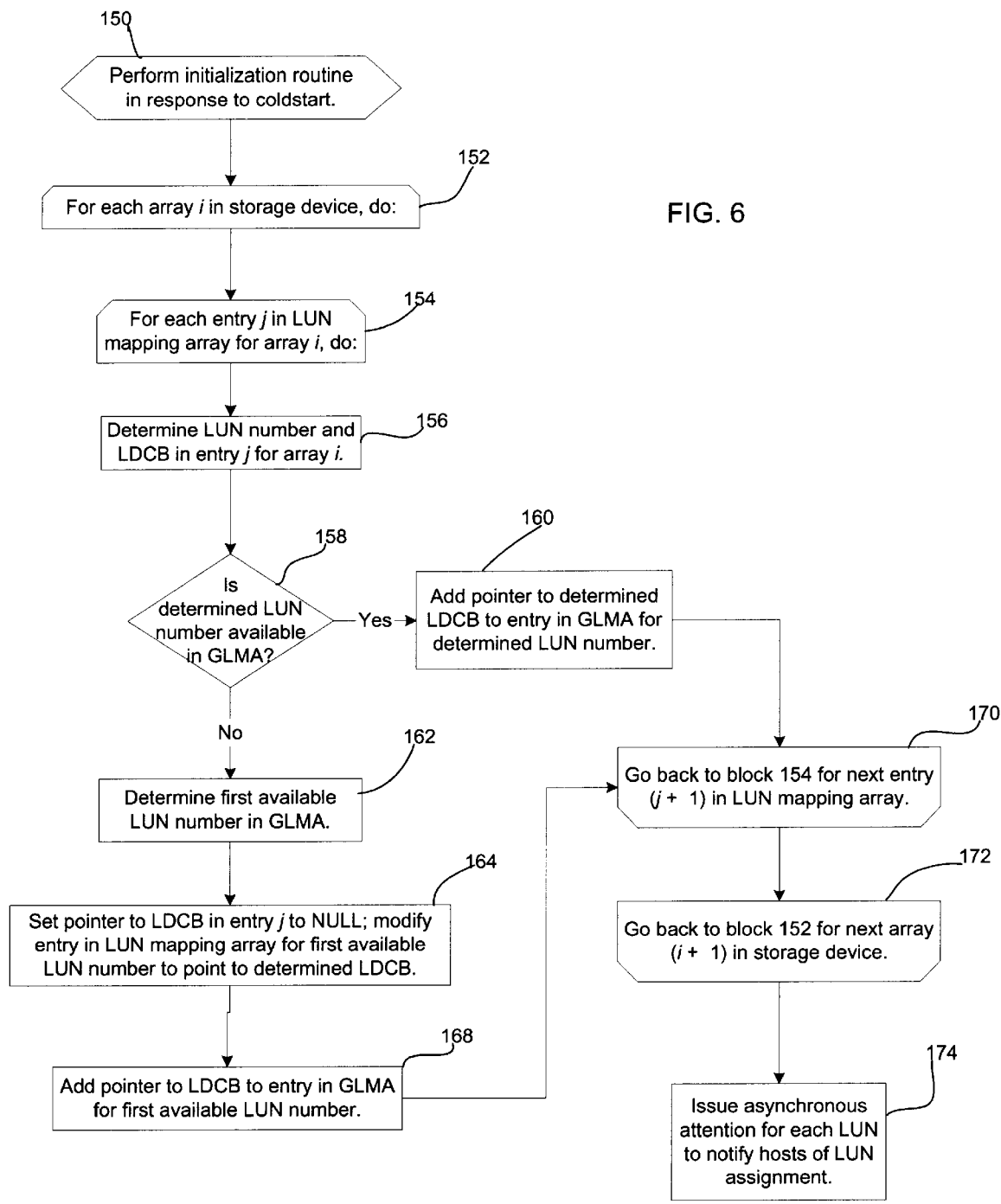
FIG. 6 illustrates logic implemented in a storage controller to determine the LUN configuration during a coldstart in accordance with preferred embodiments of the present invention.

FIG. 6 illustrates logic implemented in the firmware and/or software of the storage controllers 14a, b to initialize the global LUN mapping array (GLMA) from the data structures 50, 60, and 80 maintained in the configuration sectors of each array during a coldstart, i.e., initialization after a power-up. Control begins at block 150 with the storage controller 14a, b performing an initialization routine after a coldstart. The storage controller 14a, b performs a loop at block 152 to 170 for each array i in the storage device 16. For each array i in the storage device 16, the storage controller 14a, b performs an inner loop at block 154 through 168 for each entry j in the LUN mapping array 80 for array i. Within this inner loop, the storage controller 14a, b determines (at block 156) the LUN number and pointer to the logical disk control block (LDCB) for entry j in LUN i, which the storage controller 14a, b reads from one or more disks in the array. If (at block 158) the determined LUN number is available in the global LUN mapping array, i.e., has a NULL value, then the storage controller 14a, b adds (at block 160) a pointer to the determined logical disk control block (LDCB) to the entry in the global LUN mapping array (GLMA) for the determined LUN number to reserve that LUN number in the storage device 16 for that LDCB.

Otherwise, if the determined LUN number in entry j in the LUN mapping array 80 is not available, i.e., there already is a pointer to another LDCB, then the storage controller 14a, b determines (at block 162) the first available LUN number in the global LUN mapping array (GLMA). The storage controller 14a, b then sets (at block 164) the pointer to the LDCB for the determined LUN number in entry j of the LUN mapping array 80 to NULL, as this LUN number is already used by another array in the GLMA, and then modifies the entry in the LUN mapping array for array i for the first available LUN number to point to the determined logical device control block (LDCB). In this way, the LUN number array i previously used for the sectors specified in the determined LDCB is set to the first available LUN number that is not used by another array i in the global LUN mapping array (GLMA). The pointer to the modified LDCB is added (at block 168) to the entry in the global LUN mapping array (GLMA) for the first available LUN number. Control then proceeds (at block 170) back to block 154 to consider the next (j+1)th entry in the LUN mapping array 50 for array i. After considering all entries in the LUN mapping array for array i, control proceeds (at block 172) back to block 152 to consider the next (i+1)th array in the storage device 16. After initializing the global LUN mapping array (GLMA) with all the LUNs available from the arrays in the storage device 16, the storage device 16 issues a unit attention status for each LUN to notify the hosts of the GLMA LUN assignment.

With the logic of FIG. 6, the storage controller 14a, b obtains all the configuration data from configuration sectors in the arrays themselves. Thus, each array includes self-defining information to define the LUN configuration within the array. With this arrangement, if an array of disks is removed or added to the storage device 16 while the power to the storage controllers 14a, b is off, then upon initialization, the storage controller 14a, b will detect the configuration of any new arrays added to the storage device 16 from the self-defined configuration information, including the array control block 50, logical disk control blocks 60, and LUN mapping array 80 stored in the array.

This allows an array to be added to the system and all the LUNs and data in the array to be accessible to the hosts 4a, b attached to the storage controller 14a, b.

Figure 7:
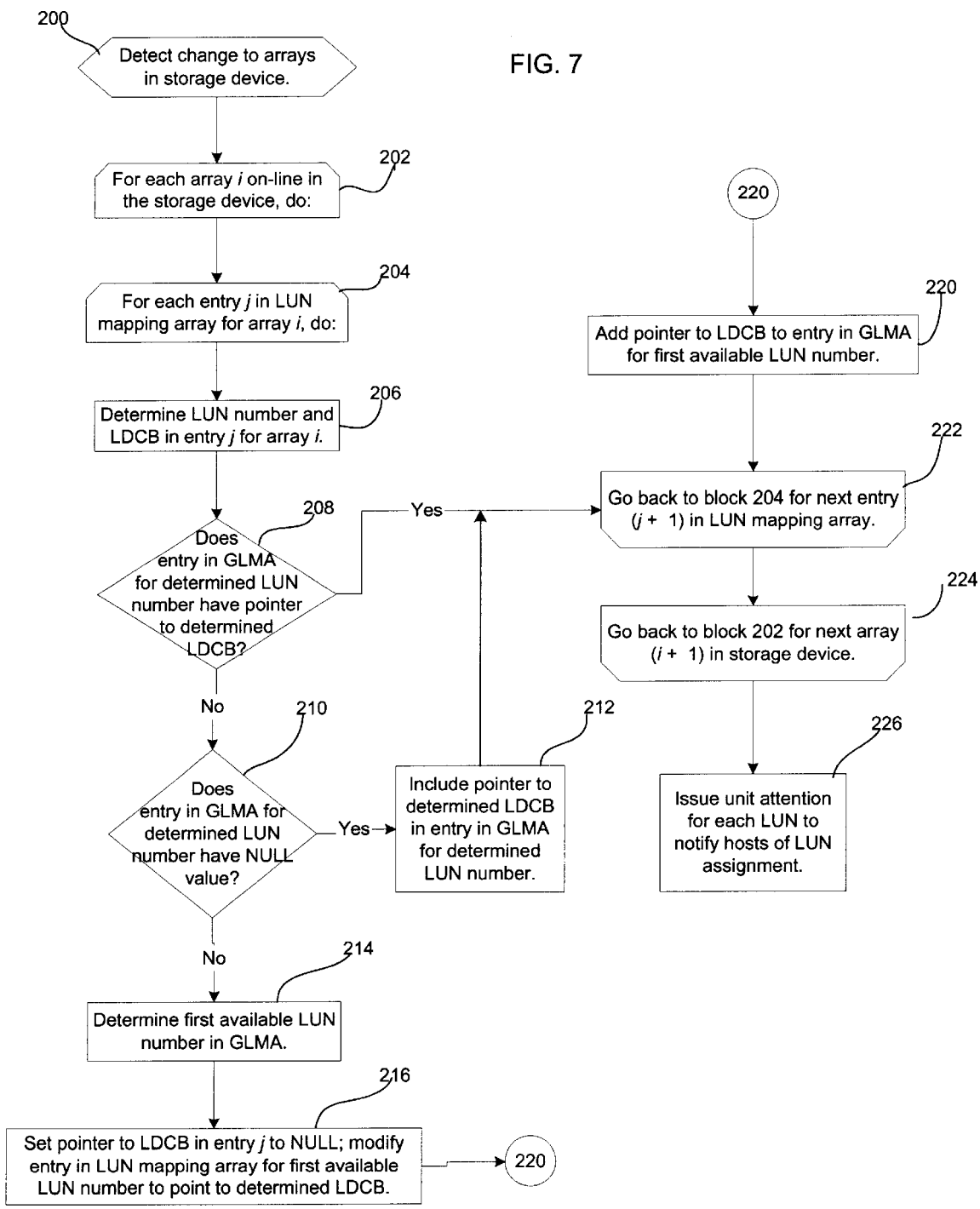
FIG. 7 illustrates logic implemented in a storage controller to determine the LUN configuration during a warmstart in accordance with preferred embodiments of the present invention.

FIG. 7 illustrates logic implemented in the storage controller to perform an initialization routine in response to a warmstart, which would occur in response to the removal or addition of an array to the storage device 16 while the controller is on-line. Thus, an array of disks can be swapped in or out of the storage device 16, e.g., DASD, while the storage controller 14a, b is on-line. In response to this alteration of the arrays in the storage device 16, the storage controller 14a, b would proceed to block 200 to begin the warmstart process. The storage controller 14a, b then begins a loop at blocks 202 to 224 for each array i on-line in the storage device. For each array i, the storage controller 14a, b then processes each entry j in the LUN mapping array 80 for array i at block 206. Within this inner loop at blocks 204 to 220, the storage controller 14a, b determines the LUN number and logical disk control block (LDCB) in entry j of the LUN mapping array 80 for array i.

If (at block 208) the entry in the global LUN mapping array (GLMA) maintained by the storage controller 14a, b for the determined LUN number has a pointer to the determined logical disk control block (LDCB), then the determined LUN in the array i was configured in the storage controller 14a, b before the warmstart, and control proceeds (at block 208) back to block 222 to consider the next entry j in the LUN mapping array 80 for array i. If the entry in the global LUN mapping array (GLMA) for the determined LUN number does not have a pointer to the determined logical disk control block (LDCB), then the storage controller 14a, b further determines (at block 210) whether the entry in the global LUN mapping array (GLMA) for the determined LUN number has a NULL value. If so, then the pointer to the determined logical disk control block (LDCB) is included (at block 212) in the entry in the global LUN mapping array (GLMA) for the determined LUN number and then control proceeds to block 222 to consider the next entry in the LUN mapping array 80.

Otherwise, if the entry in the global LUN mapping array (GLMA) already includes a pointer to a different LDCB, then that LUN number is being used by an array that was configured in the storage subsystem before the warmstart. In such case, the storage controller 14a, b determines (at block 214) the first available LUN number in the global LUN mapping array (GLMA), i.e., the entry having a NULL value. The storage controller 14a, b then sets (at block 216) the pointer in entry j in the LUN mapping array i to NULL, as the LUN number in this entry j is already used by another array in the GLMA, and modifies the entry in the LUN mapping array for array i for the first available LUN number to point to the determined logical device control block (LDCB). In this way, the LUN number array i previously used for the sectors specified in the determined LDCB is switched to another LUN number that is not configured in another array in the global LUN mapping array (GLMA). The pointer to the modified LDCB is added (at block 220) to the entry in the global LUN mapping array (GLMA) for the first available LUN number. Control then proceeds (at block 222) back to block 204 to consider the next (j+1)th entry in the LUN mapping array 50 for array i. After considering all entries in the LUN mapping array for array i, control proceeds (at block 224) back to block 202 to consider the next (i+1)th array in the storage device 16. After initializing the global LUN mapping array (GLMA) with all the LUNs available from all on-line arrays in the storage device 16, the storage controller 14a, b issues a unit attention status for each LUN added or removed to notify the hosts of the new LUN changes.

If the detected change was the removal of an array, then the storage controller 14a, b would have to verify that each current logical number entry in the global LUN mapping array (GLMA) maps to an existing array, i.e., whether the pointer to the array control block 60 in the logical disk control block (LDCB) 60 is to a valid array. Thus, after detecting a change, the storage controller 14a, b would first determine all connected arrays. If an entry in the global LUN mapping array pointed to a non-existent array, then the LDCB pointer for that entry would be made NULL. After nullifying the pointers for all LUN entries in the global LUN mapping array (GLMA) that include a pointer to a logical device control block (LDCB) for the removed array, the storage controller 14a, b would then proceed to block 202 in FIG. 7 to verify the existing configuration.

With the logic of FIG. 7, an array of disks that have preexisting data and a LUN configuration may be plugged-into the storage device 16 so that the array LUN configurations added to the global LUN mapping array (GLMA) would be accessible to hosts 4a, b connected to the storage controller 14a, b. All the LUN configuration data for the array is maintained in the array sectors. Thus, when the array is plugged into the storage device 16, the array itself provides the LUN configuration information to the storage controller 14a, b to allow the array's LUNs to be added to the system. Further, with the preferred embodiments, arrays may be added and removed, and the changes are configured into the storage subsystem with a warmstart operation, without having to endure a coldstart.

Expanding the Size of An Array

The above discussed logic of FIG. 5 applies in the me where the array size, i.e., number of disks in the array control block remains (ACB) 50 constant. However, in further embodiments, disks may be added to an array to expand the disk size of the array. Preferred embodiments allow disks to be added to expand the storage space of the array so that subsequently added LUNs are configured to use the expanded storage space of the array. In preferred embodiments, if an array is expanded by adding disks, the sectors and LUNs in the pre-expansion array are not affected, and post-expansion LUNs are mapped to sections of the new expanded disks array. Thus, the capacity field 66 in the logical device control block (LDCB) 60 indicates the sector capacity of the disks indicated in the range of the first 72 and last 74 disk indexes. Further the sector offset field 68 indicates the sector offset from the disk indicated in the first disk index 72 field. In this way, any LUNs added after an expansion of the arrays map to only those disks in the expansion, i.e., the disks between the first 72 and last 74 disk indexes.

In the preferred embodiments, LUNs added after the disk expansion do not affect the data and LUN configuration in the pre-expansion disks. This allows the expansion of an array and immediate use of the expanded sections of the array without requiring multiple copy operations. For instance, in the prior art, if an array is expanded, the data existing prior to the expansion would be copied to another location, the disks would be added, and then the array would be configured for all the disks. The LUNs would then be reconfigured for the entire new expanded array, and the LUN data copied back to the newly configured array. Thus, in the prior art, to add disks to an array, the data in the pre-expansion LUNs must be taken off-line until the LUNs are reconfigured with the new disks in the array and the LUN data copied over to the newly configured expanded array.

With the preferred embodiments, the data in the pre-expansion storage space of the arrays remains available when additional disks are added to the array. Further, the data in the pre-expansion storage space does not have to be moved back and forth to the array once the disks are added because the pre-expansion LUNs remain on the pre-expansion disks. New LUNs may be configured on the new disks.

In preferred embodiments, the storage controller 14a, b would maintain a list of a range of disks prior to any expansion, from disk 0, and ranges resulting from an expansion. Thus, if there are multiple disk additions to an array at different points in time, then there would be a separate disk range of first 72 and last 74 disk indexes for each expansion.

In disk array expansion embodiments, the logic of FIG. 5 would have to be modified to accommodate that there are separate ranges of disks in the array on which data can be separately striped. Thus, at block 112 in FIG. 5, the storage controller 14a, b would determine the first range of disks that have enough available room to include LUN x with n sectors. The storage controller 14a, b would proceed down the list of disk ranges until the first range is found that is large enough to provide space for LUN x. Further, at block 120 when generating the fields in the logical device control block (LDCB), the storage controller 14a, b would set the first 72 and last 74 disk indexes to the first and last disks in the first range found that is large enough to provide space for LUN x.

In preferred embodiments, data is striped across the disks. This occurs by writing data to one disk for a number of sectors equal to the sector depth before switching to the next disk to write the next depth of sectors. Thus, a stripe has a length equal to the number of disks in the array and a width equal to the sector depth on which data is written before switching to the next disk in the stripe. Each stripe includes a parity sector.

FIG. 8 illustrates an example of an array of sectors implemented in four disks and how the data for two LUNs 0 and 1 is striped across the four disks. The examples in FIGS. 8 and 9 utilize a RAID 5 configuration, where all disks in the array store data and parity, i.e., parity is interleaved with the data. Each disk forms a column in the array and has nine sectors to allow for three stripes having a depth of three sectors. LUN 0 has eighteen sectors and LUN 1 has nine sectors. Thus, the array is formed of the disks, which make up the columns, and the sectors from each disk that make up the rows of the array. As can be seen from FIG. 8, three sectors of parity data are stored in the first stripe (row) of the first disk 0, the next three sectors on disk 1 comprise the first three sectors of LUN 0. Parity for stripe 1 is stored in sectors on disk 1, or column 1. Thus, there are nine parity sectors, one for each row of data in the array. In this way, the parity sector stores the parity data for all the data sectors in its row. The format of the numbers in each entry representing a sector in the disks of "X/LY-Z" is used, where "X" indicates the array sector, "LY" indicates the LUN number in that sector, "Z" indicates the sector in the LUN, and "P indicates that the sector stores parity data for the stripe. The logical device control blocks (LDCBs) LDCB 0 and LDCB 1 provide the information for LUN 0 and LUN 1, respectively, in the array shown in FIG. 8.

For example, LDCB 0 may have the following fields:
capacity=18 sectors;
sector offset 0;
depth 3;
first disk index=0;
second disk index=3.

and in this example LDCB 1 has the following fields:
capacity=9 sectors;
sector offset 18;
depth 3;
first disk index=0;
second disk index=3.

Thus, LDCB 0 for LUN 0 has eighteen sectors and begins at sector 0 in the sectors comprising the first four disks 0–3. LDCB 1 for LUN 1 has 9 sectors and begins at the eighteenth sector within the group of sectors in disks 0–3.

If disks are added to an array, then, as discussed, any future LUNs added after the expansion would be added to the new disks without affecting the pre-expansion LUNs and data in the disks in the array prior to the expansion. FIG. 9 illustrates an example of expanding the array shown in FIG. 8 by adding disks 4 and 5 and adding two more LUNs 2 and 3 using twelve and six sectors, respectively, in disks 4 and 5. Thus, two disks are added to the array as shown in FIG. 9 and two post-expansion LUNs 2 and 3 are added without affecting LUNs 0 and 1 stored in the sectors of the first four disks 0–3.

LDCB 2 would have the following fields:
capacity=12 sectors;
sector offset 0;
depth 3;
first disk index=4;
second disk index=5.

LDCB 3 would have the following fields:
capacity=6 sectors;
sector offset 12;
depth 3;
first disk index=4;
second disk index=5.

Thus, the LDCB mapping information shows that LUNs 2 and 3 are striped on disks 4 and 5, and that LUN 2 begins at the first sector 0 of disks 4 and 5 and that LUN 3 begins at an offset of twelve, e.g., sector 12, of the sectors in disks 4 and 5. Further, the sectors in disks 4 and 5 do not include any parity data because the parity sectors for the stripes are maintained in the first four disks 0–3.

The presence of parity data and the possibility that LUNs may be separately stripped across different groups of disks, such as in the above example where LUNs 0 and 1 are striped across disks 0–3 and LUNs 2 and 3 are striped across disks 4 and 5, increases the complexity in determining how a sector in a LUN maps to a sector in the array. The array manager sees the array as a series of sequential sector numbers beginning at 0 and then moving down the sector depth and to the next disk to move down the sector depth of that sector. FIGS. 8 and 9 show the sector numbering for the array before and after the expansion, respectively. Thus, when a host 4a, b requests an I/O operation with respect to a LUN number and a sector within the LUN, the storage controller 14a, b includes logic to map the requested sector in a LUN to an array sector, taking into account parity data and the separation of striping onto different sets of disks in an array due to an expansion.

To perform the mapping from a requested LUN and sector to a sector in the array, the storage controller 14a, b would access the logical device control block (LDCB) 60 for the requested LUN from the LUN mapping array 80 and use the information in the LDCB to determine the mapping to the array sector. Following are variables used to determine a mapping from a requested sector s in LUN x that are derived from the LDCB:

DI1: this is the first disk index 72 from the LDCB for LUN x.

DI2: this is the last disk index 74 from the LDCB for LUN x.

depth: is the depth of the array from the depth field 70 in the LDCB for LUN x.

sOffset: the sector offset of the beginning of the LUN in the range of disks between the first and second indexes. This is determined from the sector offset field 68 in the LDCB for LUN x.

Following are temporary variables used in the calculation to determine the array sector for LUN x and sector s:

aOffset: a sector offset into the array of where LUN x begins.

hSect: desired sector from LUN that host wants, i.e., sector s.

aSect: this is the array sector or the value to calculate indicating the sector in the array where sector s in LUN x is located.

IWidth: the width in terms of number of disks across which the sectors of the LUN are striped.

aWidth: the width of the entire array calculated from the array control block (ACB) 50.

stripe: the stripe in the array, having a width equal to the depth, where the requested sector s for LUN x resides.

pCol: the logical column where parity resides for the stripe variable.

sCol: the logical column where the requested sector s resides in the stripe.

FIG. 10 illustrates logic implemented in firmware and/or software of the storage controller 14a, b to determine the array sector (aSect) for a sector s in LUN x that is the subject of an I/O request. Control begins at block 300. If the first disk index 72 is equal to zero, i.e., the LUN is within the pre-expansion range of disks which includes the parity data, then the width or number of disks on which the LUN is striped (IWidth) is determined (at block 306) as the last disk index 74 (DI2) minus the first disk index 72 (DI1). Otherwise, if the LUN is striped in the expanded range of disks, then the IWidth is determined (at block 306) as DI2 minus DI1 plus one, to account for the fact that there is no parity data in the expanded disks and that data is on all of the disks added during the expansion.

The storage controller 14a, b then determines (at block 308) the sector offset into the array (aOffset), which is the first sector of the first disk in the range of disks including LUN x calculated as: the first disk index 72 (DI1) times the depth field 70. The sector s that the host wants (hSect) is then calculated (at block 310) as the requested sector s (hSect) plus the sector offset (sOffset) from the LDCB in field 68, which is the beginning of the LUN x including the requested sector. The storage controller 14a, b then determines (at block 312) the stripe including the requested sector s in LUN x by dividing the offset to the requested sector (hSect) in the array by the IWidth times the sector depth and returning the integer value of the division operation.

The sector in the array (aSect) is then calculated (at block 314) as the sum of three values: (1) the sector at the beginning of the stripe in the first column of the entire array, which is the stripe calculated at block 312, times the aWidth (which is the width of the entire array) times the depth; (2) disk or column including requested sector (hSect), which is hSect Modulo (IWidth *depth); and (3) the sector offset of the beginning sector of the first disk in the range of disks including, or aOffset.

However, further adjustment to the array sector (aSect) may be needed if the array sector is in the pre-expansion set of disks which also have parity data. If (at block 316), the first disk index 72 (DI1) is not the first disk in the array, i.e., in the pre-expansion portion of the array, then no parity adjustment is necessary and aSect is returned (at block 32) as the sector in the array having the data for the requested sector s in LUN x. Otherwise, if the array sector is in the range of pre-expansion disks that include parity data, then the parity column (pCol) in the stripe including the requested sector is determined (at block 324) as row MODULO IWidth, or width of the pre-expansion array. A determination (at block 326) is then made of the column including the array sector (sCol), which is (hSect MODULO (depth * IWidth))/depth. If (at block 328) the array sector is in a column (sCol) that follows or equals the parity column (pCol), then pAdjust is set (at block 330) to the depth; otherwise, pAdjust is zero. The array sector (aSector) is then increased by the depth at block 332 to avoid the parity column.

Thus, with the preferred embodiments, an array of disks may be expanded without affecting the LUNs or data on the pre-expansion disks. This is accomplished by configuring any new LUNs on disks added after the expansion, so that the pre-expansion LUNs and data are not affected by the addition of the new LUNs and disks.

Conclusion

The following describes some alternative embodiments for accomplishing the present invention.

The preferred embodiments may be implemented as a method, apparatus or program using standard programming and/or engineering techniques to produce software, firmware, hardware, or any combination thereof. The code and instructions in which the preferred embodiments are implemented are accessible from and embedded in an information bearing medium, which may comprise one or more computer-readable devices, firmware, programmable logic, memory devices (e.g., EEPROMs, ROMs, PROMs, RAMs, SRAMs, etc.), hardware, electronic devices, a computer readable magnetic storage unit, CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

In preferred embodiments, the storage subsystem 12 included two controllers 14a, b and one port 18a, b on each controller. In further embodiments, the subsystem 12 may include more than two controllers and more than one port on each controller. Further, there may be more than one path from any one host to each controller.

The preferred logic of FIGS. 5–7 describe specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments.

Preferred embodiments described particular counters, data structures and algorithms for providing self-defining configuration information in an array that can be used to configure the storage controller to add the array to the storage subsystem. In alternative embodiments, different data structures and algorithms may be used to provide the self-defining configuration information in the array.

In preferred embodiments, the storage device comprised disk arrays, such as a DASD, where the arrays comprised hard disk drives. In alternative embodiments, the portable and self-contained arrays may contain non-volatile storage medium other than hard disk drives, such as optical disks, tapes, etc.

In preferred embodiments, the disks in the array are configured as a RAID 5 array. In alternative embodiments, different algorithms may be used to configure the data and logical unit in the array, including other RAID configurations as well as non-RAID configurations.

In preferred embodiments, the hosts view the storage space as a series of LUN numbers. In alternative embodiments, logical numbers and techniques other than LUNs may be used to provide host systems a logical view of the storage space.

Preferred embodiments were described with respect to SCSI commands, such as the SCSI inquiry command used to obtain inquiry data from a SCSI server. In non-SCSI embodiments, different commands may be used to obtain the inquiry data for a LUN. In such case, the format of the inquiry data the controllers return may differ.

In summary, preferred embodiments disclose a method, system, and program for expanding storage space in an array of storage units. The storage space formed by the storage units is configured as logical units to store data. Storage units are added to the array to form an expanded storage space. The storage units in the array prior to the addition of the storage units are in a pre-expansion storage space. At least one additional logical unit is configured in the expanded storage space such that the logical units existing prior to the addition of the storage units in the pre-expansion storage space are not affected by the logical units configured in the expanded storage space.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for expanding storage space in an array of storage units, wherein the storage space formed by the storage units is configured as logical units to store data, comprising:
   adding storage units to the array to form an expanded storage space, wherein the storage units in the array prior to the addition of the storage units are in a pre-expansion storage space;
   configuring at least one additional logical unit in the expanded storage space, wherein a configuration of the logical units existing prior to the addition of the storage units in the pre-expansion storage space is not affected by the logical units configured in the expanded storage space.

2. The method of claim 1, further comprising generating configuration information stored in the array indicating a mapping of logical units to storage blocks in the array.

3. The method of claim 2, wherein the mapping indicates a range of storage units in the pre-expansion storage space for each logical unit existing in the array prior to the expansion and a range of storage units in the expanded storage space for each logical unit configured in the expanded storage space.

4. The method of claim 1, further comprising:
   striping data to logical units in the pre-expansion storage space across the storage units in the pre-expansion storage space; and
   striping data to logical units in the expanded storage space to the storage units in the expanded storage space.

5. The method of claim 1, wherein each stripe extends through storage blocks in the pre-expansion and expanded parts of the array, further comprising:
   writing parity data for each stripe in storage blocks in the pre-expansion storage space, wherein the parity data for each stripe includes parity information for storage blocks in the stripe extending through the pre-expansion and expanded storage spaces.

6. The method of claim 5, wherein the array storage blocks are numbered sequentially across the stripes that extend a width of the entire array, including pre-expansion and expanded storage spaces, and further comprising:
   receiving an input/output request toward a requested storage block within a logical unit, wherein the storage block number indicates an offset from a first storage block in the logical unit; and
   determining an array storage block for the requested storage block and logical unit, wherein the determined array storage block indicates an offset from a first storage block in the entire array.

7. The method of claim 6, wherein determining the array storage block for the requested storage block comprises:
   determining the stripe including the requested storage block;
   determining an array storage block indicating the offset of a beginning of the determined stripe from the first storage block in the array;
   determining a storage unit on which the requested storage block resides;
   determining an offset from the first storage block in the array to a first storage block in the expanded or pre-expansion array including the requested storage block; and
   adding the determined array storage block, the determined storage unit and the determined offset to obtain the offset from the first storage block in the array where the requested storage block is located.

8. The method of claim 7, further comprising
   adjusting the result of the addition operation based on whether a column of the array including the parity data follows or equals a column of the array including the requested storage block to take into account the parity data.

9. A system for expanding storage space, comprising:
   an array of storage units, wherein the storage space is formed by the storage units and configured as logical units to store data;
   means for adding storage units to the array to form an expanded storage space, wherein the storage units in the array prior to the addition of the storage units are in a pre-expansion storage space;
   means for configuring at least one additional logical unit in the expanded storage space, wherein a configuration of the logical units existing prior to the addition of the storage units in the pre-expansion storage space are is not affected by the logical units configured in the expanded storage space.

10. The system of claim 9, further comprising means for generating configuration information stored in the array indicating a mapping of logical units to storage blocks in the array.

11. The system of claim 10, wherein the mapping indicates a range of storage units in the pre-expansion storage space for each logical unit existing in the array prior to the expansion and a range of storage units in the expanded storage space for each logical unit configured in the expanded storage space.

12. The system of claim 9, further comprising:
means for striping data to logical units in the pre-expansion storage space across the storage units in the pre-expansion storage space; and
means for striping data to logical units in the expanded storage space to the storage units in the expanded storage space.

13. The system of claim 9, wherein each stripe extends through storage blocks in the pre-expansion and expanded parts of the array, further comprising:
means for writing parity data for each stripe in storage blocks in the pre-expansion storage space, wherein the parity data for each stripe includes parity data information for storage blocks in the stripe extending through the pre-expansion and expanded storage spaces.

14. The system of claim 13, wherein the array storage blocks are numbered sequentially across the stripes that extend a width of the entire array, including pre-expansion and expanded storage spaces, and further comprising:
receiving an input/output request toward a requested storage block within a logical unit, wherein the storage block number indicates an offset from a first storage block in the logical unit; and
determining an array storage block for the requested storage block and logical unit, wherein the determined array storage block indicates an offset from a first storage block in the entire array.

15. The system of claim 14, wherein the means for determining the array storage block for the requested storage block comprises:
determining the stripe including the requested storage block;
determining an array storage block indicating the offset of a beg of the determined stripe from the first storage block in the array;
determining a storage unit on which the requested storage block resides;
determining an offset from the first storage block in the array to a first storage block in the expanded or pre-expansion array including the requested storage block; and
adding the determined array storage block, the determined storage unit and the determined offset to obtain the offset from the fist storage block in the array where the requested storage block is located.

16. The system of claim 15, further comprising
means for adjusting the result of the addition operation based on whether a column of the array including the parity data follows or equals a column of the array including the requested storage block to take into account the parity data.

17. An electronically accessible information bearing medium including code for use in expanding a storage space in an array of storage units, wherein the storage space formed by the storage units is configured as logical units to store data, wherein the code is capable of causing a processor to perform:
adding storage units to the array to form an expanded storage space, wherein the storage units in the array prior to the addition of the storage units are in a pre-expansion storage space; and
configuring at least one additional logic unit in the expanded storage space, wherein a configuration of the logical units existing prior to the addition of the storage units in the pre-expansion storage space is not affected by the logical units configured in the expanded storage space.

18. The information bearing medium of claim 17, further comprising generating configuration information stored in the array indicating a mapping of logical units to storage blocks in the array.

19. The information bearing medium of claim 18, wherein the mapping indicates a range of storage units in the pre-expansion storage space for each logical unit existing in the array prior to the expansion and a range of storage units in the expanded storage space for each logical unit configured in the expanded storage space.

20. The information bearing medium of claim 17, further comprising:
striping data to logical units in the pre-expansion storage space across the storage units in the pre-expansion storage space; and
striping data to logical units in the expanded storage space to the storage units in the expanded storage space.

21. The information bearing medium of claim 17, wherein each stripe extends through storage blocks in the pre-expansion and expanded parts of the array, further comprising:
writing parity data for each stripe in storage blocks in the pre-expansion storage space, wherein the parity data for each stripe includes parity information for storage blocks in the stripe extending through the pre-expansion and expanded storage spaces.

22. The information bearing medium of claim 21, wherein the array storage blocks are numbered sequentially across the stripes that extend a width of the entire array, including pre-expansion and expanded storage spaces, and further comprising:
receiving an input/output request toward a requested storage block within a logical unit, wherein the storage block number indicates an offset from a first storage block in the logical unit; and
determining an array storage block for the requested storage block and logical unit, wherein the determined array storage block indicates an offset from a first storage block in the entire array.

23. The information bearing mediumn of claim 22, wherein determining the array storage block for the requested storage block comprises:
determining the stripe including the requested storage block;
determining an array storage block indicating the offset of a beginning of the determined stripe from the first storage block in the array;

determining a storage unit on which the requested storage block resides;

determining an offset from the first storage block in the array to a first storage block in the expanded or pre-expansion array including the requested storage block; and adding the determined array storage block, the determined storage unit and the determined offset to obtain the offset from the first storage block in the array where the requested storage block is located.

24. The information bearing medium of claim 23, further comprising adjusting the result of the addition operation based on whether a column of the array including the parity data follows or equals a column of the array including the requested storage block to take into account the parity data.

* * * * *

UNITED STATES PATENT AND TRADEMARK OFFICE
CERTIFICATE OF CORRECTION

PATENT NO.         : 6,651,154 B1
APPLICATION NO.    : 09/614074
DATED              : November 18, 2003
INVENTOR(S)        : David Alan Burton and Robert Louis Morton It is certified that error appears in the above-identified patent and that said Letters Patent is hereby corrected as shown below:

Column 6, line 62-63, "This allows an array…" should not be a new paragraph.

Column 8, line 40, delete "disks array." and insert -- disk. -- .

Column 15, line 2, after "space", delete "are".
Line 27, after "stripe includes parity", delete "data".
Line 50, delete "beg" and insert -- beginning -- .
Line 60, delete "fist" and insert -- first -- .

Column 16, Line 59, delete "mediumn" and insert "medium".

Signed and Sealed this

Twenty-first Day of November, 2006

JON W. DUDAS
*Director of the United States Patent and Trademark Office*